Inventor
ASGAUT T. REIN
By Edward Goldberg
Attorney

United States Patent Office 3,538,241
Patented Nov. 3, 1970

3,538,241
ARRANGEMENT FOR CAPACITIVE CONTROL OF THE VOLTAGE DISTRIBUTION ON ELECTRICAL INSULATORS
Asgaut T. Rein, Trondheim, Norway, assignor to Elektrisitetsforsyningens Forskningsinstitutt, Trondheim, Norway
Filed Oct. 14, 1968, Ser. No. 767,432
Claims priority, application Norway, Oct. 18, 1967, 170,184
Int. Cl. H01b 17/28; H02g 15/02
U.S. Cl. 174—143             6 Claims

ABSTRACT OF THE DISCLOSURE

An insulation tape having spaced electrode strips thereon is wound along a supporting insulation member between terminals of a high potential source to provide a series connection of capacitors for voltage distribution.

BACKGROUND OF THE INVENTION

Field of the invention

This invention relates to an arrangement for capacitive control of the voltage distribution on high voltage electrical insulators such as supporting insulators, bushings, and joints for cables and bars and the like.

Description of the prior art

It has been known previously that the voltage distribution on the surface of such insulators may be controlled by connecting capacitors in series between the high voltage and ground (zero potential). Such capacitors should preferably be arranged as close as possible to the parts or surfaces of the insulators where the voltage or field distribution is to be controlled or equalized. It is also known that bushings having solid insulation consisting of impregnated wound paper may have metallic foils inserted at regular intervals in the paper winding. The series connected capacitors thereby obtained may be designed to provide the desired modification of the voltage or field distribution. Such bushings are called capacitor type bushings. It is additionally known to connect conventional capacitors in series between high voltage and ground in order to obtain corresponding results.

SUMMARY OF THE INVENTION

The main feature of the present invention is that an insulation tape is provided with spaced electrode layers or strips and is arranged on the insulation between high voltage and ground to obtain a series connection of capacitors. This type of capacitor arrangement utilizing insulative tapes provided with spaced electrode layers or strips facilitates installation and requires less space. An additional advantage is that it is possible to arrange the equalizing capacitors closer to the insulation surface. The invention thus provides a flexible system making possible voltage control of different types of insulators, bushings and joints, using a limited selection of tapes. The above-mentioned and other features and objects of the invention will be more fully explained in the following description taken with reference to the drawings.

DESCRIPTION OF THE PREFERRED EMBODIMENTS

Figure 1:
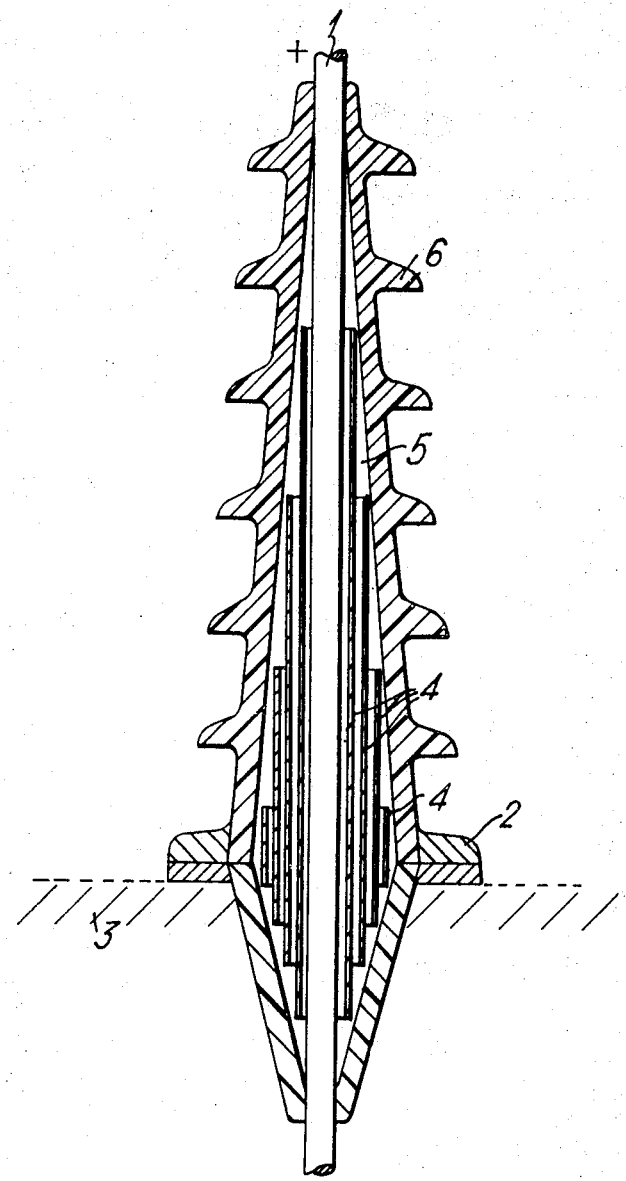
FIG. 1 shows in principle a partial cross section of a conventional high voltage bushing with voltage control according to a known method.

FIG. 1 shows in principle a conventional high voltage bushing. The voltage varies along the bushing from high voltage at the conductor 1 to zero voltage at the grounded flange 2 at the surface of an electrical apparatus such as a transformer 3. In order to secure an even voltage distribution along the bushing, coaxial metal screens 4 are inserted around the conductor within the insulation 5. The bushing is provided with an outer enclosure or screen 6 of porcelain, for example.

Figure 2:
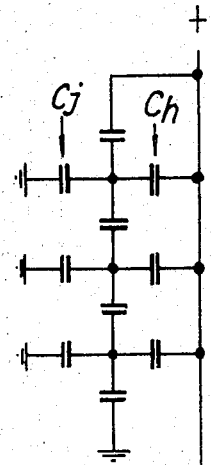
FIG. 2 shows an equivalent electrical diagram of a bushing with no voltage control.

FIG. 2 shows the equivalent electrical diagram of a bushing with no voltage control. In order to simplify the diagram, the bushings is divided into a certain number of sections, in this case, four. $C_j$ represents the capacitance from the bushing to ground, while $C_h$ represents the capacitance from the bushing to the high voltage conductor. The capacitances $C_j$ are not of equal size, nor are the capacitances $C_h$. The voltage distribution along the bushing is usually very uneven, with the largest voltage gradient at the ground side of the bushing.

Figure 3:
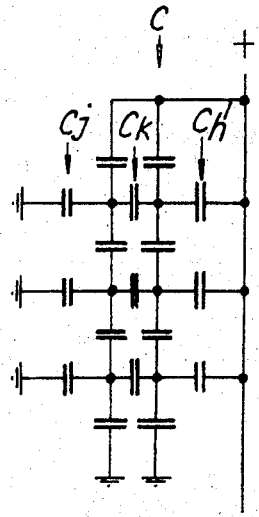
FIG. 3 shows the equivalent electrical diagram of a bushing with capacitive voltage control.

An equivalent electrical diagram for a bushing using capacitive control of the voltage distribution is shown in FIG. 3. Artificial capacitors C, all usually of equal capacitance, are connected in series between the high voltage and ground. The voltage is stepped down smoothly from high voltage to ground along this series of capacitors for a properly selected capacitance. When the series is arranged such that the capacitance $C_k$ from the interconnections to the surface of the bushings, is relatively large, the voltage is controlled in a desired manner. In order to obtain the desired control, the capacitances C and $C_k$ should be dominating.

Figure 4:
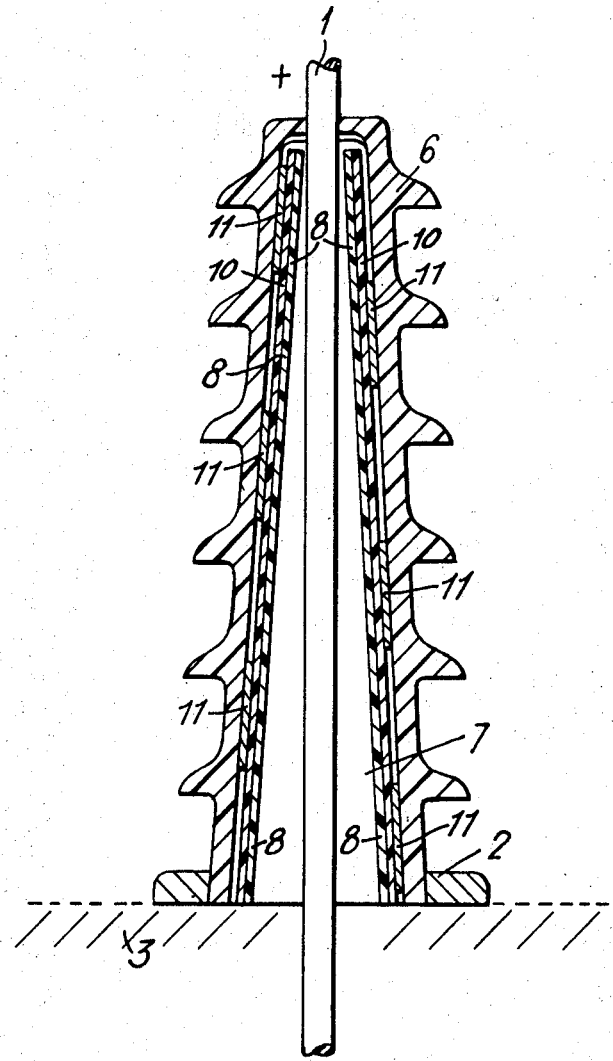
FIG. 4 shows a partial cross section of a high voltage bushing with voltage control according to the present invention.

The present invention provides a new and advantageous type of capacitive voltage control. FIG. 4 shows in principle a capacitive bushing provided with capacitive voltage control according to the present invention. The high voltage bushing itself consists of a high voltage conductor 1, insulation 7 (solid, liquid or gaseous) and an outer insulator screen or enclosure 6. The voltage distribution control is obtained by placing or winding one or more layers of insulation tape 10 having spaced electrode layers or strips 11 along the surface of the tape on the supporting insulation 7 or on a carrier such as a tube or housing 8, in such a way that a series connection of capacitors is obtained. One plate of the capacitors at one end of the tape layer is connected to the high voltage conductor 1, while one plate of the capacitors at the other end is connected to ground. The capacitances are chosen such that an adequate voltage distribution along the bushing is obtained.

In FIGS. 5a, 5b and 5c and 6a and 6b there are shown alternative tapes which are considered suitable for providing a series connection of capacitors.

Figure 5A:
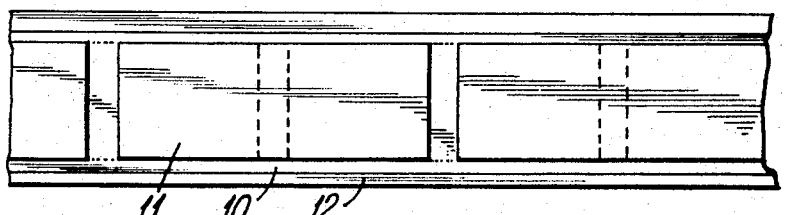
FIGS. 5a, 5b and 5c show top and side sectional views of alternate embodiments of a tape suitable for use in an arrangement for voltage control as shown in FIG. 4,
FIGS. 6a and 6b show top and side views of a further variation of the novel tape.
Figure 5B:
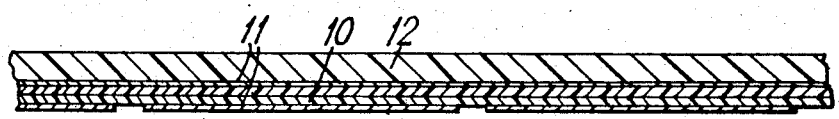
Figure 5C:
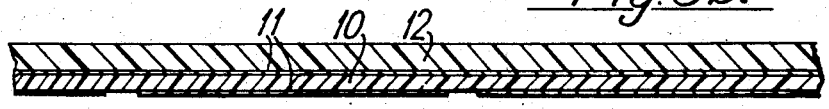

FIGS. 5b and 5c show tapes provided with a plurality of electrodes along each side displaced relative to each other so that the tape itself comprises a series connection of capacitors. A dielectric tape 10 in FIG. 5c is provided with electrodes 11 on both sides, while in FIG. 5b the tape 10 is split in two in order to facilitate manufacturing of the tape. It is considered necessary to use an additional insulation and carrier tape 12 so as to provide sufficient insulation between layers. Such insulation and carrier tape 12 may also be arranged on both sides of the tape consisting of the tape 10 and the electrodes 11.

Figure 6A:
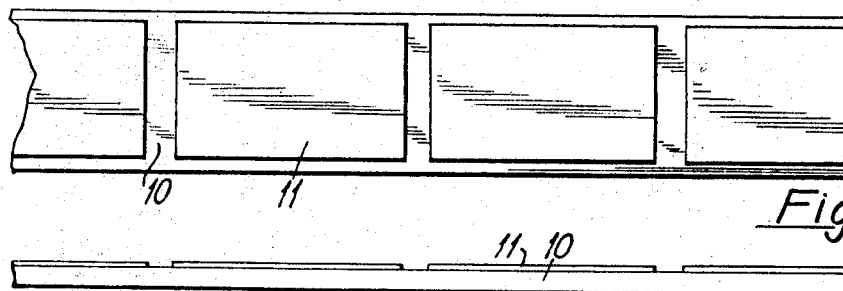
Figure 6B:
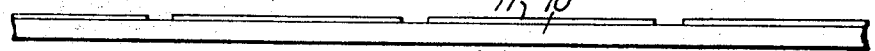

FIGS. 6a and 6b show an insulation tape 10 provided with electrodes 11 on only one side. When this tape is wound coaxially on the supporting insulation, series connected capacitors are obtained. The capacitance of this arrangement depends on the electrode length, the circumference of the body on which the tape is wound and the pitch of the winding. Two such tapes may be placed together to provide the embodiment shown in FIG. 5b.

The electrode strips 11 arranged along the insulation tape 10 may for instance be a metallic or semiconducting foil, or a layer provided by vapor deposition or spraying.

Figures 7A, 7B:
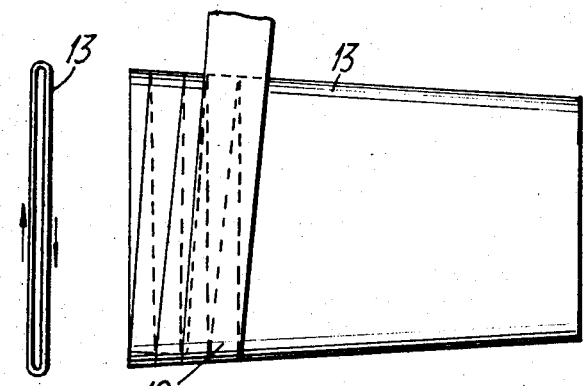
FIGS. 7a and 7b show top and side views of a sleeve upon which tapes may be arranged so as to provide series connected capacitors.

FIGS. 7a and 7b show an alternate embodiment of the invention, where tapes of the type described in connection with FIGS. 5b, 5c and 6b are wound or arranged on a sleeve 13 of insulation material. The complete sleeve is then folded around along the surface of the supporting insulation thereby eliminating or reducing the inductance of the arrangement.

The voltage control arrangement may be impregnated if necessary. It may be built as a separate unit with suitable terminals or it may be built into the outer screen on the bushing.

The electrical insulation material used in the voltage control arrangement may be any suitable material chosen independently of the material in the bushing itself. If a high-grade film material is used, the volume of the arrangement is at a minimum.

In the preceding description there has been considered voltage control arrangements for high voltage bushings, but it is obvious that said arrangement may also be used in other parts of electrical systems, such as supporting insulators and joints. For certain types of equipment or components, the arrangement will be assembled in a factory or workshop, while in other cases it may be practical to undertake the assembly in the field, as for instance in connection with end joints for cables.

It is also possible to use two or more parallel connected tapes which are arranged in layers to obtain the optimum capacitance values in a particular case. If the tape is wound with the same winding direction all the time, this will cause inductance which in certain cases may be undesirable. This effect may be reduced, for example, by using layers with different winding directions or by winding tapes in sections with alternating winding directions. The arrangement shown in FIGS. 7a and 7b is favorable in this respect.

What is claimed is:

1. An arrangement for capacitive control of the voltage distribution on high voltage electrical insulators including a high voltage source and a ground connection, a longitudinal conductor connected to the high voltage source, an enclosure of insulating material surrounding and supporting said conductor, insulating means surrounding said conductor between said conductor and enclosure, and an insulation tape helically wound around said insulating means in overlapping layers progressing along the length of the inner surface of said enclosure, said tape having a plurality of spaced electrode strips arranged along a surface of the tape and being connected between the high voltage and ground to provide a series connection of capacitors.

2. The arrangement according to claim 1 wherein said electrode strips are positioned on each side of said tape.

3. The arrangement according to claim 2 including a further layer of insulation tape carrying the first said tape and said electrodes thereon.

4. The arrangement according to claim 1 wherein said enclosure and insulating means have a conical shape and said insulation tape is supported on said insulating means.

5. The arrangement according to claim 4 including two layers of tapes wound on said insulating means in different winding directions.

6. The arrangement according to claim 4 wherein the tape is wound on said insulating means in sections with alternating directions.

References Cited

UNITED STATES PATENTS 2,301,882  11/1942  Kappeler _____ 174—143

FOREIGN PATENTS 64,391  4/1946  Denmark.
742,448  12/1932  France.

OTHER REFERENCES

German printed application, Holland, No. 1,107,316, published May 25, 1961.

LARAMIE E. ASKIN, Primary Examiner

U.S. Cl. X.R.

174—73